United States Patent [19]

Carnes

[11] 4,321,744

[45] Mar. 30, 1982

[54] METHOD OF SECURING A METAL SHEATHED ELECTRIC HEATING ELEMENT

[75] Inventor: Donald W. Carnes, Cockeysville, Md.

[73] Assignee: Electro-Therm, Inc., Laurel, Md.

[21] Appl. No.: 165,331

[22] Filed: Jul. 2, 1980

Related U.S. Application Data

[62] Division of Ser. No. 19,120, Mar. 9, 1979, Pat. No. 4,241,291.

[51] Int. Cl.³ ...................... B21D 39/00; B23P 11/02
[52] U.S. Cl. ......................................... 29/523; 29/611; 219/336; 219/523; 219/536; 219/542; 338/315
[58] Field of Search .............. 219/316, 318, 335, 336, 219/5, 523, 536, 537, 541, 542, 544; 29/611, 523; 338/228, 315, 326; 60/121; 151/69; 227/51, 55; 403/197

[56] References Cited

U.S. PATENT DOCUMENTS

| 495,753 | 4/1893 | Platt | 227/51 |
|---|---|---|---|
| 630,675 | 8/1899 | Ferrall | 60/121 |
| 2,670,529 | 3/1954 | Thomas | 219/544 X |
| 2,748,251 | 5/1956 | Drummond | 219/336 |
| 2,757,271 | 7/1956 | Fitzgerald | 219/523 X |
| 2,799,767 | 7/1957 | Bremer | 219/541 X |
| 2,810,815 | 10/1957 | Dicome | 219/336 |
| 3,012,800 | 12/1961 | Kock | 403/197 |
| 3,209,806 | 10/1965 | Currier et al. | 151/69 |
| 3,354,294 | 11/1967 | Kollar et al. | 219/536 |
| 3,525,849 | 8/1970 | Bleckmann | 219/318 |
| 3,657,519 | 4/1972 | Pease | 219/536 |
| 3,732,388 | 5/1973 | Pease | 219/536 |
| 3,778,592 | 12/1973 | Williams | 219/536 |
| 3,859,721 | 1/1975 | Cunningham et al. | 29/611 |
| 3,899,658 | 8/1975 | Yartz | 219/536 |
| 3,930,140 | 12/1975 | Pease | 219/316 |
| 3,934,116 | 1/1976 | Cunningham et al. | 219/336 |
| 3,943,328 | 3/1976 | Cunningham | 219/335 |
| 4,099,319 | 7/1978 | Vogel | 29/611 |
| 4,241,291 | 12/1980 | Carnes | 219/536 |

FOREIGN PATENT DOCUMENTS

| 1469056 | 1/1967 | France | 219/336 |
|---|---|---|---|
| 1540948 | 8/1968 | France | 219/336 |
| 406472 | 6/1966 | Switzerland | 219/336 |
| 1321294 | 6/1973 | United Kingdom | 219/536 |

Primary Examiner—Volodymyr Y. Mayewsky
Attorney, Agent, or Firm—Low and Low

[57] ABSTRACT

A method for attaching and securing an apertured mounting bracket to a metal sheathed electric heating element received therethrough to insure firm mechanical support, prevention of relative axial motion, reliable electrical grounding, and ease of adaptation to automated assembly.

4 Claims, 9 Drawing Figures

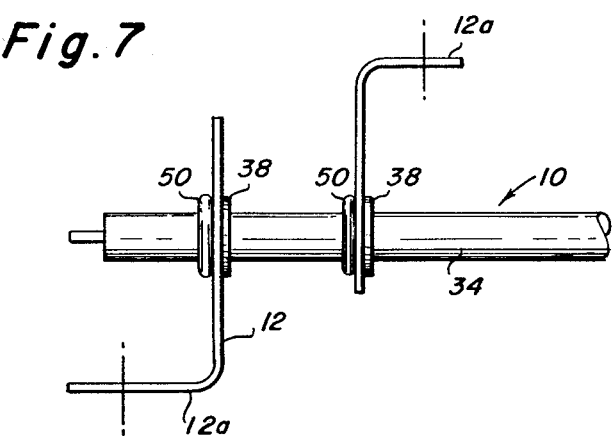
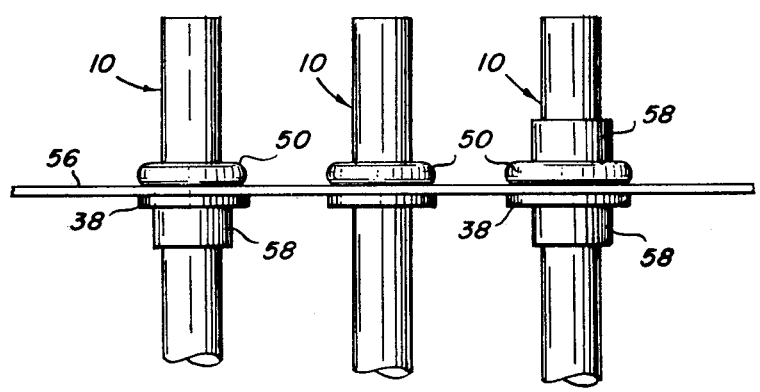
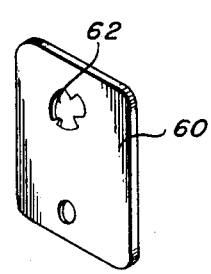

METHOD OF SECURING A METAL SHEATHED ELECTRIC HEATING ELEMENT

This is a division of application Ser. No. 19,120 filed Mar. 9, 1979 now U.S. Pat. No. 4,241,291, issued Dec. 23, 1980.

BACKGROUND OF THE INVENTION

In the assembly of appliances having sheathed electric heating elements of usual manufacture, it is necessary to provide mounting, support, or hinge brackets which are attached to the appliance housing and which are commonly apertured to receive therethrough a portion of the elongated sheathed heating element or elements.

In an effort to provide proper support for, prevent relative axial movement between, and provide good electrical contact with the bracket and the sheath for grounding or like purposes, the bracket has heretofore been affixed to the heating element as by brazing, welding, crimping, or the like. Illustrative of such prior art assemblies are the U.S. Pat. Nos. to Thomas, 2,670,529, Bremer 2,799,767, Yartz 3,899,658 and Pease 3,930,140.

Further, as the primary bracket is frequently formed from stainless steel for, flexibility, durability, ease of cleaning, and general eye appeal, it has hitherto been necessary to fabricate a multi-part connection between the bracket and heating element in order to effect the desired metal joining technique to be employed, as welding, crimping, etc. Such fabrication inherently introduces cost and handling complexity into the assembly, as when a suitable element-connectable steel plate must be first secured to the stainless steel bracket as by individual rivets prior to the actual subsequent connection to the heating element portion.

BRIEF DESCRIPTION OF THE INVENTION

The complexities of multi-element handling with resultant labor and time expense are overcome by the mounting means of the present invention and the simple yet effective method of attachng the same.

To this end, the thin, substantially planar bracket member has an aperture therethrough of greater diameter than that of the sheathed heating element portion to be received therein. A flanged tubular insert of eyelet-like configuration is slipped over and concentrically disposed about the heating element with the end flange thereof abutting one side of the bracket and the elongated tubular portion extending therethrough.

Thereafter, the eyelet flange is supported against the bracket as by an annular anvil, and the tubular extension is rapidly and compressively buckled so as to form a second outwardly extending flange-like portion adjacent the other side of the bracket, and which merges into a radially inwardly extending terminal flange, the inner periphery of which defines an opening smaller than the sheath, so as to bite thereinto, slightly inwardly deforming the heater sheath, thereby tightly locking the tubular insert to the bracket and to the sheath, with excellent mechanical support and electrical contact throughout.

Inasmuch as the assembly is effected with but a single tubular insert associated with the sheath and bracket, not only are economies of material achieved, but also a reduction in the numbers of parts being handled as well as the required operations thereon.

The mounting means of the invention constitutes in effect a single step assembly, lending itself admirably to high speed, automated handling by equipment presently available in the art, as vibratory singulating and orienting feeders and hammer-anvil die sets, for example.

BRIEF DESCRIPTION OF THE DRAWINGS

The invention will be better understood in connection with the accompanying drawings, in which:

FIG. 7 is an illustrative view of a heating element portion having two brackets mounted thereon in accordance with the invention, FIG. 8 is an illustrative view of a single bracket having a plurality of heating element portions mounted thereto in accordance with the invention; and, FIG. 9 is a perspective view of a bracket having a modified insert-receiving aperture therein.

DETAILED DESCRIPTION OF THE INVENTION

Figure 1:
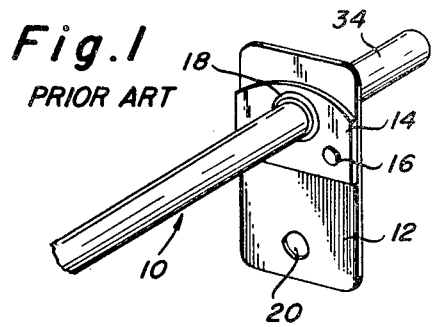
FIG. 1 is a perspective view of a typical mounting means for a sheathed heating element as employed prior to my invention.

Referring to the drawings, and as indicated above, diverse means have been employed in the prior art in mounting conventional metallic sheathed heating elements as at 10 in brackets for association with equipment housings. Thus, in the exemplary prior art illustration of FIG. 1, a typical relatively thin bracket member 12 has secured thereto a mounting plate 14. The plate 14 may be affixed to the bracket as by rivets 16, preferably two or more so as to preclude relative rotation between the plate and bracket in handling. Plate 14 may have an aperture surrounded by an annular boss 18 through which heating element 10 extends, the bracket 12 having a like aperture aligned therewith. The boss 18 may be swaged into supportive engagement with the sheath, or welded thereto, etc. as indicated. A hole or holes 20 in the bracket may provide for securement of the bracket to an equipment housing, as by one or more sheet metal screws or bolts.

It will be seen that the manipulative and mechanical operations required, as well as the parts supplies, are rather burdensome. Plural operations on the several pieces are required, with attendant labor effort, time delay and increased probability of defective or unacceptable assemblies.

Figure 3:
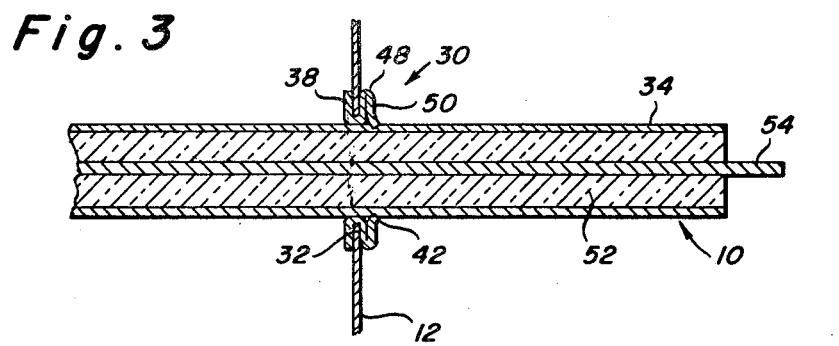
FIG. 3 is an enlarged view in sectional side elevation of the mounting means, portions of the heating element and the bracket being broken away.

The assembly 30, FIG. 3, of my invention obviates the difficulties alluded to above. The bracket 12, as before, is apertured at 32 to a diameter greater than that of outer metallic sheath 34 of heating element 10 received therethrough. Interposed between the bracket aperture 32 and sheath 34 in concentric relation to the latter is a tubular flanged insert or eyelet 36, best seen in FIG. 4, having a radial flange 38 at one extremity which abuts one face of the substantially planar bracket element 12. Extending axially from flange 38 and surrounding sheath 34 is tubular portion 40 which snugly and slidably embraces the sheath, terminating in annular edge 42.

No other components are required in effecting the assembly, and it will be seen that the use of tubular insert 36 facilitates the automatic or semi-automatic handling thereof wherein the insert alone or the insert 36 and the bracket 12 together may be mechanically dropped or slipped along the elongated sheath to the desired position of securement.

Figure 4:
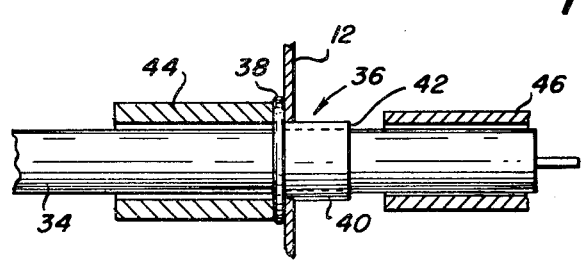
FIG. 4 is a side elevation of the heating element and tubular insert as initially assembled, with the bracket and also illustrative die members shown in section.

With the bracket and insert so located, as in FIG. 4, flange 38 is backed up by a tool such as an annular anvil 44 which may be suitably split to fit about the sheath.

Thereafter, a shaping tool such as an annular hammer generally indicated at 46 is similarly positioned to be rapidly and forcibly advanced against terminal edge 42 of insert 36.

Figure 5:
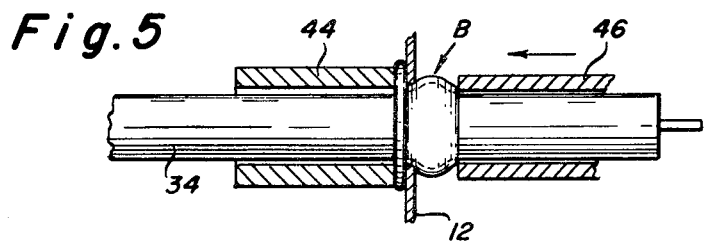
FIG. 5 is similar to FIG. 4 illustrating an intermediate step in compressing and buckling the tubular insert.
Figure 6:
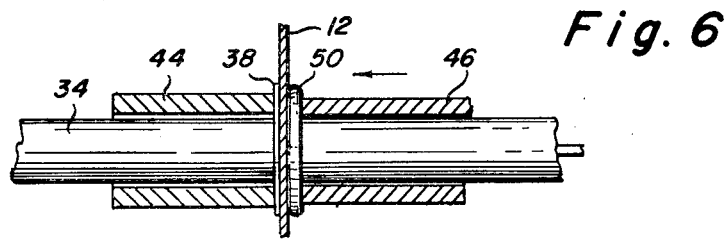
FIG. 6 is similar to FIG. 5 in showing the tubular insert at the completion of the die operation as fully collapsed as in FIG. 3.

With the heating element therein, the elongated portion 40 is constrained to buckle radially outwardly at B as seen in FIG. 5 as the tool 46 advances while anvil 44 remains stationary. Continued tool movement to the FIG. 6 position collapses the insert tubular portion 40 as shown to provide a flange-like radially outwardly extending portion 48 (FIG. 3) which reversely bends and merges into a terminal flange 50. In the final collapsing action, the edge 42 of the insert defines an annular opening of lesser diameter than sheath 34, and thereby indents or deforms the sheath about its periphery thereat.

This indentation is not excessive, and no undue pressure is exerted upon the magnesium oxide or other insulative sheath filler 52 about resistance element 54 that would damage the element. If desired, the tool 46 may have its working face shaped so as to enhance the inward deforming action of insert edge 42 as it advances axially thereagainst.

In this manner, the heating element 10 is securely mounted to the stainless steel or like spring steel bracket 12 with no likelihood of axial slippage. Further, the eyelet or insert 36, preferably of nickel plated steel, effects excellent, protected electrical contact with bracket 12 in the U-shaped clamped portion thereof defined by flanges 38, 48 and the axially extending length therebetween in bracket aperture 32.

In like manner, the reversely turned inwardly extending terminal flange 50 is deformably engaged with sheath 34 at edge 42, the mechanical connection being secure and the electrical connection as for grounding purposes being reliable and protected against deterioration, in addition to the electrical connection established through gripping engagement of the intermediate portion at aperture 32 with the heater sheath.

Figure 2:
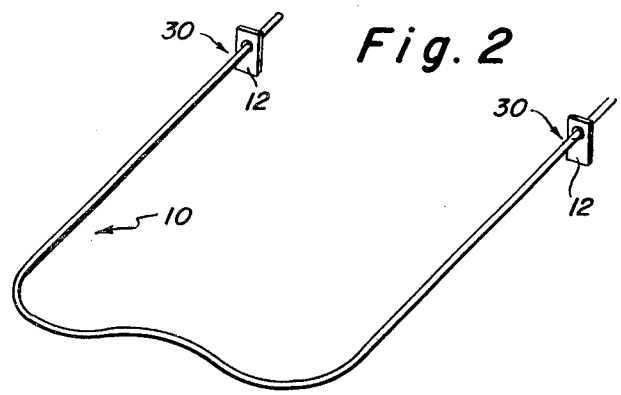
FIG. 2 is a general perspective view of a heating element having a configuration for a typical installation and including the bracket mounting means of my invention adjacent each end thereof.

In certain housing environments it is desirable to secure and support the heater element at more than one point, as adjacent terminal ends in FIG. 2. In like manner, plural support along a single linear extent thereof may be effected, as in FIG. 7. In this form, the brackets 12 each include angled legs 12a which may have holes therein for securing the same to parallel opposed housing surfaces, for example, in positively locating the heater element in its appliance.

Similarly, in FIG. 8 a bracket 56 of spring steel may be apertured to receive a plurality of heater elements 10 in spaced substantially parallel relation, or a plurality of parallel runs of the same element similarly secured to a single elongated bracket.

In each instance, as in FIGS. 7 and 8 or other arrangements commonly encountered, the mounting as at 30 provides the structure and advantages set forth hereinabove.

In one actual construction in accordance with the invention, a tubular insert or eyelet 36 having an inside diameter of about 0.328" was associated with a heater element 10 whose sheath diameter was about 0.312". The axially extending portion 40 of the insert from the flange 38 was 0.32" and when formed was found to grip securely the bracket and sheath in the manner set forth above.

FIG. 9 illustrates a modified form of bracket 60 wherein the sheath-receiving aperture therein is enlarged with respect to the sheath so that a plurality of tangs 62, three or more, extend radially inwardly sufficiently to lightly grip the insert 36 when initially associated therewith, whereby the bracket and eyelet may thus be readily unit-handled in manually or automatically associating the same with the sheath at heater element.

Although the best mode contemplated for carrying out the present invention has been herein shown and described, it will be apparent that modification and variation may be made without departing from what is regarded to be the subject matter of the invention.

What I claim is:

1. The method of securing an electric heating element having a metal sheath to an apertured planar metallic bracket comprising the steps of:

positioning a tubular eyelet of relatively thin metallic material and having a terminal radial flange within the aperture of said bracket and in concentric surrounding relation to a linear portion of said heating element, disposing the said flange of said eyelet in face-to-face relation to a substantially planar portion of said bracket adjacent the aperture therein, supporting said flange axially of said element portion, applying axial compressive force to an elongated axially extending tubular portion of said eyelet embracing said element and passing through the bracket aperture to buckle said tubular portion radially outwardly and shorten in length to form an outwardly extending flange-like portion thereof axially compressed against said bracket adjacent said aperture thereby to axially grip the bracket therebetween, with said flange-like portion merging into an axially adjacent reversely folded and radially inwardly extending terminal flange in snug axial relation and contact with said flange-like portion, with said terminal flange at its radially inner extremity defining an opening of lesser effective diameter than said sheathed heating element thereby to mechanically engage the periphery thereof and secure the bracket thereto.

2. The method of claim 1 further including the step of radially inwardly deforming the sheath of the heating element by said terminal flange.

3. The method of claim 1 wherein said bracket includes a plurality of apertures, and performing said steps with respect to a like plurality of sheathed heater element portions.

4. The method of claim 1 wherein a plurality of said brackets are provided, and performing said steps with respect to each bracket on said sheathed heater element portion.

* * * * *